United States Patent [19]

Atkinson

[11] 4,234,635

[45] Nov. 18, 1980

[54] METHOD OF RIGIDIFYING THE TEARING EDGE OF A CARTON

[75] Inventor: William G. Atkinson, London, Canada

[73] Assignee: Somerville Belkin Industries Limited, London, Canada

[21] Appl. No.: 42,992

[22] Filed: May 29, 1979

[51] Int. Cl.$^3$ ........................ B05D 5/00; B32B 23/02; B32B 9/06; B32B 29/00

[52] U.S. Cl. ...................................... 428/80; 427/285; 427/288; 427/401; 428/542; 428/194

[58] Field of Search ....................... 427/285, 288, 401; 428/194, 542, 80

[56] References Cited

U.S. PATENT DOCUMENTS

| | | | |
|---|---|---|---|
| 3,193,427 | 7/1965 | Rogers | 156/211 |
| 3,330,685 | 7/1967 | Reilly | 427/285 |

FOREIGN PATENT DOCUMENTS

| | | |
|---|---|---|
| 859544 | 12/1970 | Canada . |
| 931447 | 8/1973 | Canada . |
| 1394621 | 5/1975 | United Kingdom . |

*Primary Examiner*—Michael R. Lusignan
*Attorney, Agent, or Firm*—Fetherstonhaugh & Co.

[57] ABSTRACT

A tearing edge is formed at an edge of a paperboard blank according to the present invention by arranging a plurality of paperboard blanks in a stack with the edges which are to be reinforced disposed in a common plane and applying a clamping force to the stack of blanks and applying to the edges which are to be reinforced a coating fluid of a type which is at least semi-rigid when set and allowing the coating to set to form a rigidifying edge and thereafter releasing the clamping force to permit separation of the blanks from the stack.

5 Claims, 5 Drawing Figures

METHOD OF RIGIDIFYING THE TEARING EDGE OF A CARTON

FIELD OF INVENTION

This invention relates to cartons having tearing edges along which a web of material which is stored in the cartons may be torn in order to separate it from the web remaining in the carton. In particular, this invention relates to a method of forming a rigidified tearing edge.

PRIOR ART

Webs of material, such as plastic wrapping and aluminum foil, are commonly wound around a tubular sleeve and stored in an elongated carton. A serrated cutting edge member is attached to an edge of the carton over which the web is draped after its removal from the carton so that after the required length of web has been unwound, the web may be torn by forcing it into engagement with the serrated edge. The serrated edge members are generally in the form of a lightweight metal strip or plastic strip which is fastened or adhesively secured to the marginal edge of the carton. The serrated edge members are costly in relation to the cost of the carton and special apparatus is required for applying the serrated edge members to the carton blanks. Furthermore, the serrated edge members add significantly to the thickness of the edge portion of the blank and create difficulties in the handling of the blanks in the knockdown configuration.

In addition, a considerable number of burrs are formed at the serrated edge of metal members and these burrs tend to cause hand injuries when the cartons are in use.

The present invention overcomes the difficulties of the prior art described above by providing a tearing edge without the use of an independent serrated edge member. The tearing edge is formed by hardening or rigidifying an edge of the carton which has, preferably, been formed as a serrated edge during the formation of the blank. Hardening of the edge is achieved by the application of a hardening compound to the edge of a plurality of blanks arranged and compressed in the stack of blanks. The compression of the blanks in the stack prevents the ingress of the hardening fluid between adjacent blanks and restricts the extent of penetration of the hardening fluid at the edges of the individual blanks to prevent adhesion between the blanks which would make subsequent separation of the blanks difficult.

SUMMARY OF INVENTION

According to one aspect of the present invention, there is provided a method of forming a rigidified tearing edge at a first edge of a paperboard blank. The method includes the steps of arranging a plurality of paperboard blanks in a stack with the first edges thereof disposed in a common plane, applying a clamping force to the blank and applying to the first edges of the blank a coating fluid, of a type which is at least semi-rigid when set, and permitting the fluid to set to form a rigidifying coating at the first edge to provide a rigidified tearing edge and thereafter releasing the clamping force to permit separation of the blanks. The clamping force which is applied to the stack of blanks is sufficient to substantially prevent the ingress of hardening fluid between the blanks to thereby prevent adhesion between the marginal edge portions of the blanks.

According to a further aspect of the present invention, the first edges of the blanks are formed with the serrated edge contour before the application of the coating fluid.

EMBODIMENT OF THE INVENTION

The invention will be more clearly understood after reference to the following detailed specification read in conjunction with the drawings wherein.

Figure 1:
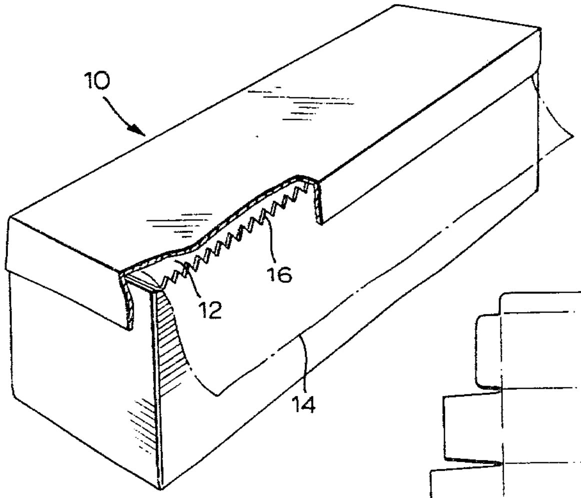
FIG. 1 is a pictorial view of a carton of the type which commonly has a serrated tearing edge.

With reference to FIG. 1 of the drawings, the reference numeral 10 refers generally to the carton according to an embodiment of the present invention. The carton has an opening 12 extending longitudinally of one corner thereof, through which a web of material 14 is dispensed. The web of material passes over the tearing edge 16.

Figure 2:
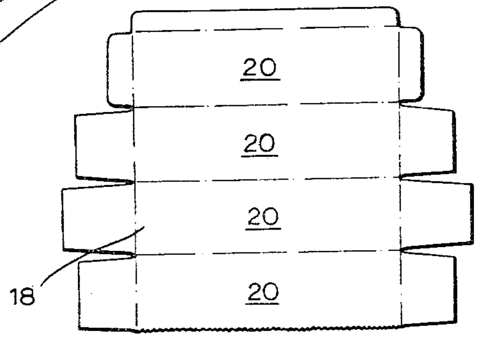
FIG. 2 is a plan view of a blank of the carton of FIG. 1.
Figure 3:
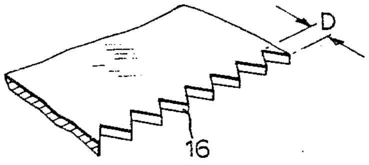
FIG. 3 is an enlarged detailed view of a portion of the serrated edge of the blank of FIG. 2.

As shown in FIG. 2 of the drawings, the blank 18 from which the carton 10 is formed is of a conventional construction and consists of a plurality of panels 20 which are hingedly connected to one another to form the side and end walls of the carton. The tearing edge 16 is preferably in the form of a serrated edge. As shown in FIG. 3 of the drawings, the serrated edge 16 has a saw tooth configuration with the teeth having a depth D.

Figure 5:
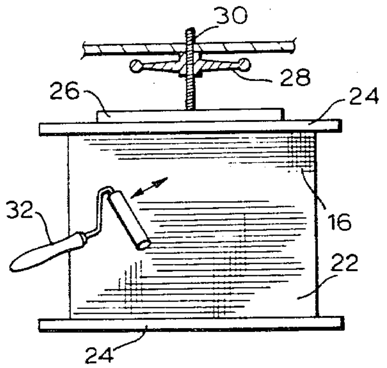
FIG. 5 is a diagrammatic illustration of the press and an apparatus for applying the rigidifying coating to the edges of the blank.

A plurality of blanks 18 are arranged in a face-to-face relationship in a stack with the edges 16 disposed in a common plane. The stack 22 of blanks 18 is located between the platens 24 of the press which is diagrammatically illustrated in FIG. 5 of the drawings and a compressive force is applied in the direction of the arrow P by means of a pressure pad 26 which is driven downwardly into engagement with the upper platen 26 by the action of a hand wheel 28 on the threaded shaft 30.

The pressure applied to the stack of cartons is applied to at least the marginal edge portion D and may be applied generally to the blanks. The pressure which is applied is sufficient to substantially prevent the ingress of the hardening fluid between adjacent blanks and thereby prevent adhesion between the marginal edge portions of the blank which would prevent subsequent separation of the blanks.

While the blanks are compressed in the stack, a coating of rigidifying fluid is applied to the edges 16 by means of a roller coater 32 of the type commonly used for applying paint and the like.

The rigidifying coating is of a type which is at least semi-rigid when set and generally consists of a volatile component and a residual component which, after the removal of the volatile component, remains as the rigidifying agent. It has been found that a suitable coating is available from General Printing Inks Limited and is identified by their trade name EHGL755003 (Trade Mark). This composition is diluted in alcohol to 25% solids and may be applied by the roller coater as has been previously described. A colour tint may be added to the rigidifying composition so that the edge to which it is applied will be coloured to be readily identified. The percentage solids in the rigidifying fluid may be adjusted for various different types of paperboard. For example, where the paperboard is very absorbent, the percentage solids may be increased to prevent excessive wicking at the edges of the blank. Where the material from which the blank is fabricated is not absorbent, the percentage solids may be reduced so that sufficient wicking will occur to ensure that the bond is formed between the edge of the carton and the coating.

After the coating has been applied, the coating is allowed to set by drawing in air or by heating the edge 16 as by directing hot air against the edges 16 or the like.

After the coating has set, the compressive force is released and the stack of blanks removed from the press and the blanks are separated one from the other.

Figure 4:
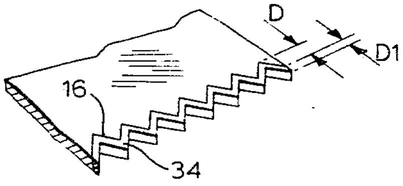
FIG. 4 is a view similar to FIG. 3 showing the edge after the application of the coating thereto.

By reason of the fact that the coating is applied and set when the blanks are arranged in the stack, the coating is applied only to the edges of the blanks and not to the surfaces adjacent the side edges. As shown in FIG. 4 of the drawings, the coating provides a rigidifying layer 34 of a thickness D1 at the serrated edge 16. This rigidifying layer 34 has been found to be sufficient to provide a satisfactory shearing edge at the edge of the carton which will permit webs on material such as plastic wrapping, aluminum foil and the like to be cut by tearing along the serrated edge.

By applying a pressure to the stack of cartons sufficient to prevent the ingress of the coating fluid between the abutting faces of the cartons, it is possible to form the rigidifying layer 34 at the side edges of the carton without bonding the adjacent blanks to one another to an extent sufficient to prevent their subsequent separation from one another after their removal from the press. It has been found that the depth of penetration of the edge by the coating fluid should preferably be limited to only slightly greater than the root depth of the serrations formed at the edge to prevent the coating migrating to the interface and acting as a bonding agent connecting the adjacent panels.

Various modifications of the present invention will be apparent to those skilled in the art without departing from the scope of the invention. In particular, the hardening fluid may be in the form of any substance which may be at least partially absorbed by the paperboard and which will set to a semi-rigid or a rigid condition to rigidify the edge of the carton.

From the foregoing, it will be apparent that the present invention provides a simple and inexpensive method of reinforcing the edge of a carton so that it may form a tearing edge.

What I claim as my invention is:

1. A method of forming a rigidified tearing edge at a first edge of a paperboard blank, said blank having a serrated marginal edge portion extending inwardly from said first edge, comprising the steps of, (a) arranging a plurality of paperboard blanks in a stack with said first edges thereof disposed in a common plane, (b) applying a clamping force to said stack of blanks to press at least said marginal edge portions towards one another to an extent sufficient to substantially prevent the ingress of hardening fluid therebetween and thereby prevent adhesion between the marginal edges of the sheets, (c) applying to said first edges of the stack of blanks a coating liquid of a type which is at least semi-rigid when set, (d) setting said coating to form a rigidifying coating at said first edge and thereby provide a rigidified tearing edge, (e) releasing the clamping force to permit separation of the blanks from the stack.

2. A method as claimed in claim 1 wherein said first edge of each blank is formed with a serrated edge contour before the application of said coating liquid whereby upon setting of said coating a rigidified serrated edge is formed.

3. A method as claimed in claim 2 wherein the coating liquid consists of a volatile component and a residual component which, after the removal of the volatile component, remains as a rigidifying agent.

4. A method of forming a rigidified tearing edge at a first edge of a paperboard blank, said blank having a serrated marginal edge portion extending inwardly from said first edge, comprising the steps of:

(a) arranging a plurality of paperboard blanks in a stack with said first edges thereof disposed in a common plane, (b) applying a clamping force to said stack of blanks to press at least said marginal edge portions towards one another to an extent sufficient to substantially prevent the ingress of hardening fluid therebetween and thereby prevent adhesion between the marginal edges of the sheets, (c) applying to said first edges of the stack of blanks a coating liquid consisting of a volatile component and a residual component which, after removal of the volatile component, remains as a rigidifying agent, (d) removing the volatile component of the coating liquid to leave the residual component as a coating on the first edges of the blank to form said rigidified tearing edge, (e) releasing the clamping force to permit separation of the blanks from the stack.

5. A carton blank having a reinforced edged formed in accordance with the method of claim 1.

* * * * *